United States Patent [19]

Ruiz et al.

[11] Patent Number: 5,031,860
[45] Date of Patent: Jul. 16, 1991

[54] INTEGRATED CAPSULIZED CABIN FOR PASSENGER AIRCRAFT

[76] Inventors: Rene A. Ruiz, 8419 Bellaire Blvd., Houston, Tex. 77036; George Spector, 233 Broadway, RM 3815, New York, N.Y. 10007

[21] Appl. No.: 447,785

[22] Filed: Dec. 8, 1989

[51] Int. Cl.5 .................. B64D 13/02; B64D 25/12
[52] U.S. Cl. ........................ 244/118.5; 244/140; 49/362; 49/139; 49/379
[58] Field of Search .............. 244/118.5, 119, 120, 244/121, 129.5, 140; 114/335, 336, 342; 49/362, 360, 139, 379, 31

[56] References Cited

U.S. PATENT DOCUMENTS

| 2,925,860 | 2/1960 | Dunn | 49/379 |
| 3,169,466 | 2/1965 | Cramer | 244/140 |
| 4,699,336 | 11/1987 | Diamond | 244/140 |

Primary Examiner—Joseph F. Peters, Jr.
Assistant Examiner—Anne E. Bidwell

[57] ABSTRACT

An integrated capsulized cabin for a passenger aircraft is provided and consists of an independent frame structure with a pair of bulkheads on each end in which sliding bulkhead doors will close by air pressure during air pressure loss to seal the cabin. A very strong elastic wire mesh material is disposed about the frame structure within the fuselage of the aircraft to reinforce the frame structure during expansion and contraction conditions.

5 Claims, 2 Drawing Sheets

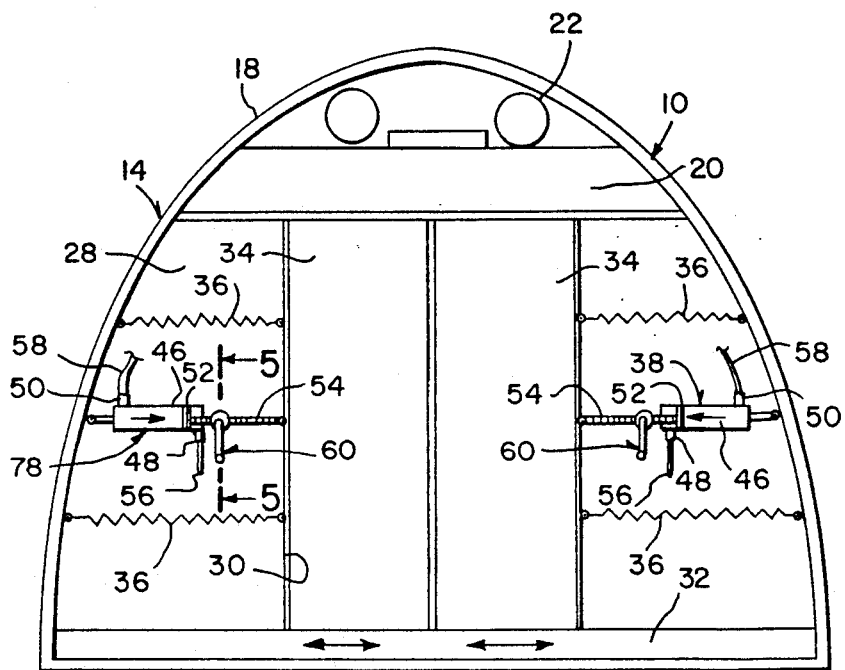
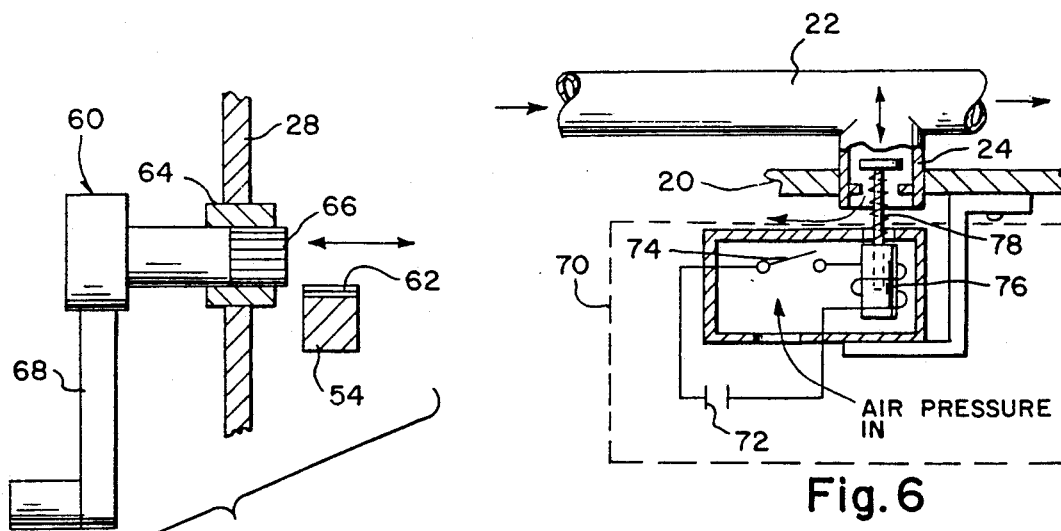
Fig. 4
Fig. 5
Fig. 6

INTEGRATED CAPSULIZED CABIN FOR PASSENGER AIRCRAFT

BACKGROUND OF THE INVENTION

The instant invention relates generally to reinforced panel structures and more specifically it relates to an integrated capsulized cabin for a passenger aircraft which provides a separate section which will always maintain its shape and air pressure.

There are available various conventional reinforced panel structures which do not provide the novel improvements of the invention herein disclosed.

SUMMARY OF THE INVENTION

A primary object of the present invention is to provide an integrated capsulized cabin for a passenger aircraft that will overcome the shortcomings of the prior art devices.

Another object is to provide an integrated capsulized cabin for a passenger aircraft being a separate section that will maintain its external shape even after an accident occurs so as to save lives.

An additional object is to provide an integrated capsulized cabin for a passenger aircraft being a separate section that will maintain its air pressure inside if the rest of the aircraft structure fails such as stress fatigue, corrosion, sabotage, etc.

A further object is to provide an integrated capsulized cabin for a passenger aircraft that is simple and easy to use.

A still further object is to provide an integrated capsulized cabin for a passenger aircraft that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 4 is a diagrammatic end view of the capsulized cabin showing the mechanism to open and close the doors by air pressure and manual operation.

FIG. 5 is an enlarged cross sectional view taken along line 5—5 in FIG. 4, showing the rack and pinion system for the manual operation to override the air pressure operated door system.

FIG. 6 is a diagrammatic detail view of the air pressure sensitive switch system to close the cabin inlet valve when there is an air pressure loss.

DETAILED DESCRIPTION OF THE PREFERRED EMBODIMENTS

Figure 1:
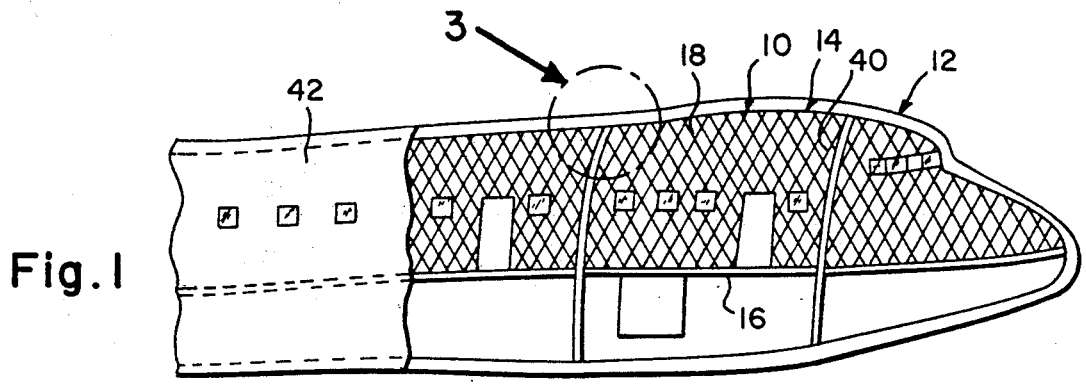
FIG. 1 is a diagrammatic side view with parts broken away of an aircraft incorporating the invention therein.
Figure 2:
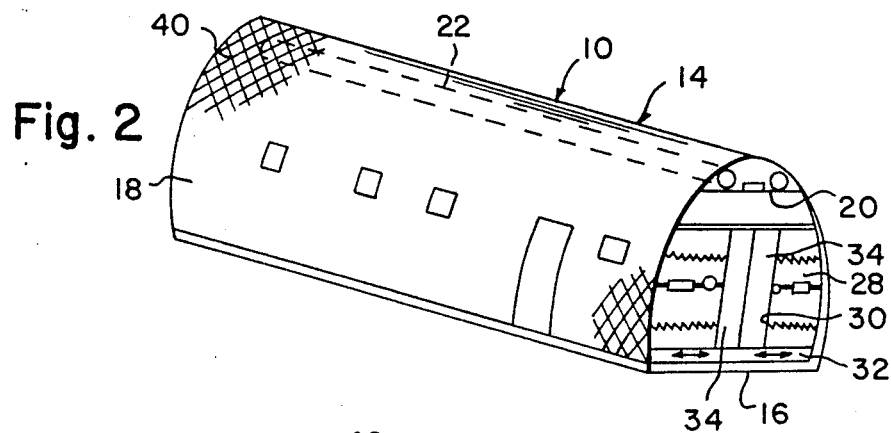
FIG. 2 is a perspective view of one of the capsulized cabins removed from the aircraft.
Figure 3:
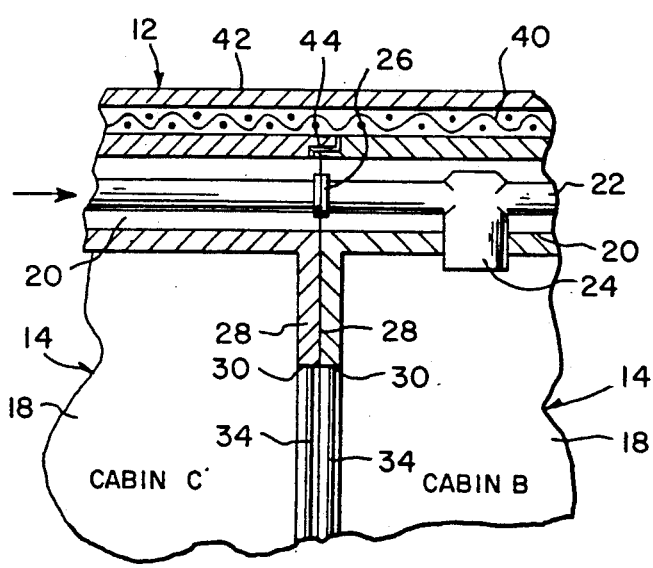
FIG. 3 is an enlarged diagrammatic cross sectional view as indicated by numeral 3 in FIG. 1, showing the frangible connection and outflow valve utilized in the air pressure and air conditioning duct and a sealing gasket disposed between the cabins to prevent air leakage from a cabin capsule when an adjacent capsule is broken away.

Turning now descriptively to the drawings, in which similar reference characters denote similar elements throughout the several views, FIGS. 1 through 4 illustrate an integrated capsulized cabin 10 for a passenger aircraft 12 consisting of an independent inverted U-shaped frame structure 14 having a flat floor 16 and a continuous curved side wall 18 with an upper compartment 20. An air pressure and air conditioning duct 22 is provided having at least one inlet valve 24 and a frangible connection 26 at each end of the duct 22 which is carried through the upper compartment 20 in the frame structure 14.

A bulkhead 28 is disposed at each end of the frame structure 14 and has a doorway opening 30 and tracks 32. A pair of sliding doors 34 ride in the tracks of each of the bulkheads 28. Tension springs 36 extend between edge of each sliding door 34 and the side wall 18 of the frame structure 14 to normally keep the sliding doors 34 open. An air pressure mechanism 38 is for closing each of the sliding doors 34 during air pressure loss so as to seal the cabin 10.

A very strong elastic mesh material 40 is disposed between the frame structure 14 and the fuselage 42 of the aircraft 12 to reinforce the frame structure 14 during expansion and contraction conditions. A sealing gasket 44 is disposed at each end of the frame structure 14 about the bulkhead 28 below the mesh material 40 so that the cabin 10 can maintain its air pressure when in position within the aircraft 12.

Each air pressure closing mechanism 38 includes a hydraulic cylinder 46 having an inlet port 48 and an outlet port 50. The cylinder 46 is affixed to the side wall 18 of the frame structure 14. A plunger 52 is operable within the cylinder 46, while a piston rod 54 is affixed at one end to the plunger 52 and at other end to the edge of the sliding door 34. A pipe line 56 is coupled to the inlet port 48 of the cylinder 46 and inside of the cabin 10. Another pipe line 58 is coupled to the outlet port 50 of the cylinder 46 and to air pressure source so that if there is air pressure loss within the cabin 10 the door 34 will close.

A manual operating mechanism 60 is provided to close and open each door 34 by overriding the air pressure closing mechanism 38. The mechanism 60, as best seen in FIG. 5, includes the piston rod 54 having a rack portion 63 formed thereon. A sleeve 64 is carried in the bulkhead 28 adjacent the rack portion 62. A pinion shaft 66 is slideable with the sleeve 64 so as to make contact with the rack portion 62 when pushed inwardly into the sleeve 64. A crank arm 68 is connected to free end of the piston shaft 66 to manually rotate the pinion shaft 66 to manually rotate the pinion shaft 66 when the pinion shaft is in contact with the rack portion 62.

FIG. 6 shows an air pressure sensitive switch system 70 to close the cabin inlet valve 24 when there is an air pressure loss. The system 70 includes a battery 72, a normally opened air pressure sensitive switch 74 and a solenoid 76 having its spring biased arm 78 connected to the valve 24.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An integrated capsulized cabin for a passenger aircraft comprising:
    (a) an independent inverted U-shaped frame structure having a flat floor and a continuous curved side wall with an upper compartment;
    (b) an air pressure and air conditioning duct having at least one inlet valve and a frangible connection at each end of said duct which is carried through said upper compartment in said frame structure;
    (c) a pair of bulkheads, each having a doorway opening and tracks disposed at one end of said frame structure;
    (d) two sets of sliding doors, each said set riding in said tracks of one of said bulkheads;
    (e) at least four tension springs, each extending between edge of one said sliding door and said side wall of said frame structure to normally keep said sliding door open;
    (f) means for closing each of said sliding doors by air pressure during air pressure loss so as to seal said cabin;
    (g) a very strong elastic mesh material disposed between said frame structure and the fuselage of the aircraft to reinforce said frame structure during expansion and contraction conditions; and
    (h) a pair of sealing gaskets, each disposed at one end of said frame structure about said bulkhead below said mesh material so that said cabin can maintain its air pressure when in position within the aircraft.

2. An integrated capsulized cabin as recited in claim 1, wherein said air pressure closing means includes:
    (a) a hydraulic cylinder having an inlet port and an outlet port, said cylinder affixed to said side wall of said frame structure;
    (b) a plunger operable within said cylinder;
    (c) a piston rod affixed at one end to said plunger and at other end to the edge of said sliding door;
    (d) a pair of pipe lines, one said pipe line is coupled to inlet port of said cylinder and inside of said cabin, while other said pipe line is coupled to outlet port of said cylinder and to air pressure source so that if there is air pressure loss within said cabin said door will close.

3. An integrated capsulized cabin as recited in claim 2, further including a manual operating mechanism to close and open each door by overriding said air pressure closing means.

4. An integrated capsulized cabin as recited in claim 3, wherein each said manual operating mechanism includes:
    (a) said piston rod having a rack portion formed thereon;
    (b) a sleeve carried in said bulkhead adjacent said rack portion;
    (c) a pinion shaft slideable within said sleeve so as to make contact with said rack portion when pushed inwardly into said sleeve; and
    (d) a crank arm connected to free end of said pinion shaft to manually rotate said pinion shaft when said pinion shaft is in contact with said rack portion.

5. An integrated capsulized cabin as recited in claim 4, further including an air pressure sensitive switch system to close said cabin inlet valve when there is an air pressure loss.

* * * * *